Patented Feb. 4, 1936

2,029,539

UNITED STATES PATENT OFFICE 2,029,539

CONDENSATION PRODUCT AND PROCESS

Joseph B. Niederl, New York, N. Y.

No Drawing. Application August 2, 1934, Serial No. 738,049

10 Claims. (Cl. 260—154)

The present invention is directed to the products formed by the condensation of aromatic hydroxy compounds with unsaturated aliphatic alcohols or alkenols.

My invention provides a simple and effective method whereby phenols, for example, may be condensed in the presence of suitable kationoid condensing agents having an acid reaction, such as sulphuric acid, with the alkenols under such conditions that intermediate sulphuric acid esters of the condensation products are formed. The phenols may be substituted compounds but they must have a free reactive nuclear position available for condensation. These intermediate esters may be hydrolyzed to give the final products.

In practicing my invention I may condense phenols with oleyl alcohol in the presence of kationoid substances with an acid reaction, notably sulfuric acid, to form hydroxyl-aryl-octadecyl alcohols. The reaction may be carried out in an inert organic solvent, preferably glacial acetic acid and takes place readily at below 100° C.

I have furthermore found, that on treating a phenoxy octa decyl alcohol with a similar kationoid agent the same products result.

In practicing this invention one mol of any phenol containing a free reactive nuclear position available for condensation is mixed with one mol of oleyl alcohol. To this mixture, or to the corresponding phenoxy octa decyl alcohol, under constant stirring, the kationoid condensing—or isomerizing agent such as: sulfuric acid, hydrochloric acid, zinc chloride, aluminum chloride, or cupric chloride is added and heated not over 100° C. An inert solvent or diluent, such as glacial acetic acid, chloroform and others may be added simultaneously. After this treatment has been extended for several hours the condensation product, or rearrangement product respectively, can be isolated, first by removing the kationed condensing or rearrangement agent and subsequent washings of the reaction product, or by fractional distillation under diminished pressure. All these condensation or rearrangement products can be distilled without decomposition in vacuo and can also be crystallized under suitable conditions.

The term "alkenols" as used herein is intended to include the aliphatic unsaturated alcohols, such as vinyl, allyl, crotyl, oleyl and phytyl. It also includes substitution products thereof, such as aryl, halogen, nitro and the like as is well known.

The term "phenoxy-octadecyl alcohols" as used herein is understood to refer to any substituted and non-substituted phenoxy-octadecyl alcohol such as: phenoxy-octa decyl alcohol itself, cresoxy-(o-m-p) thymoxy-, octyl-phenoxy, chlorophenoxy-, nitro phenoxy-, naphthoxy and such phenoxy octadecyl alcohols in which the phenyl radical carries other reactive groups such as: amino-, hydroxy-, carbonyl (aldehydic and ketonic) and carboxy groups.

Derivatives of the oleyl alcohol such as its esters, notably its sulfuric acid ester or acetate can be used for condensation and in such cases, if hydrolysis is avoided, the corresponding hydroxy-phenyl-octa decyl alcohol esters are obtainable. Similarly the ether of oleyl alcohol can be condensed in exactly an identical manner.

The products obtained are colorless or pale yellow oily or waxy solids. They are useful as antiseptics and germicidal agents. Their sulfonated derivatives (sulfates or sulfonic acids) are excellent wetting agents. With formaldehyde and the usual treatment they yield phenolic resins with valuable physical and chemical characteristics. They are characterized in that they no longer contain the unsaturated bond of the oleyl alcohol. Structurally they are hydroxyaryl-octadecyl alcohol derivatives containing one or more free phenolic hydroxyl groups.

The final products of the present invention may be characterized by the following structural formula

wherein A is an aryl nucleus, R is hydrogen or an alkyl or aryl nucleus, and R' is an alkyl nucleus of one or more carbon atoms.

In general the reactions forming the final products are as follows:

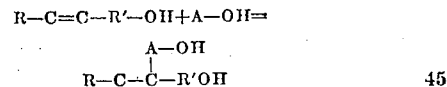

When the condensing agent is sulfuric acid or equivalent substances and the conditions are such as to provide an excess of sulfuric acid such that one mol of the same acts to combine, and the excess a condensing agent, then the reactions may be considered as follows:

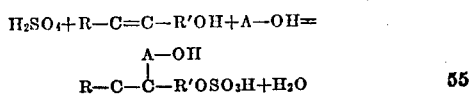

As typical examples for preparing these compounds, the following is given:

Example 1

One mol of phenol and one mol of oleyl alcohol is treated with 0.2 mol of cupric chloride with vigorous stirring. The temperature is gradually raised to about 70° C. and the reaction mixture kept at this temperature for several hours. The resulting reaction product is treated with water to remove and recover the catalyst. The washed condensation product is then distilled under diminished pressure. The portion boiling at above 200° C. at 3 mm. or at 250° C. at 15 mm. is the hydroxy-phenyl octa decyl alcohol.

Example 2

One mol of oleyl alcohol is mixed with 1.5 to 2 mols of concentrated sulfuric acid in the cold. To this mixture one mol of meta cresol is added under constant stirring. The reaction mixture is gradually heated to 60–70° C. and kept at this temperature for about 2 hours. After this time the reaction mixture is poured into water and the resulting foaming emulsion is broken up by the addition of salt or hydrochloric acid. An oil separates which gradually solidifies. The product proved to be the sulfuric acid ester of the hydroxy phenyl octa decyl alcohol.

This mono sulfate can be hydrolyzed in the usual manner and the sulfur free condensation product is distilled under diminished pressure. The fraction boiling from 220–240° C. at 3 mm., or 265–280° C. at 15 mm. is collected and consists chiefly of the hydroxy-m-methyl-phenyl-octadecyl alcohol.

Example 3

One mol of p-cresoxy-octadecyl alcohol (b. pt. 200–210 C. at 3 mm.) is refluxed with 20% sulfuric acid-glacial acetic acid mixture, for several hours. The reaction mixture is then poured into water and the oil separated. As the product may be partially esterified (acetate and sulfate) it is saponified in the usual manner. The hydrolyzed product is then distilled in vacuo. The portion boiling at 265–280° C. at 15 mm. is collected and is the hydroxy-p-methyl-phenyl-octa decyl alcohol.

Example 4

One mol of oleyl alcohol is mixed with more than one mol of concentrated sulfuric acid and to this mixture one mol of finely powdered p-tert. octyl phenol is added under constant vigorous stirring. The reaction mixture is gradually heated to about 70° C. and kept at this temperature for several hours. Afterwards the reaction mixture is treated with water to remove any unreacted sulfuric acid. The hydroxy-tert. octyl-phenyl-octadecyl mono sulfate may be hydrolyzed and the resulting hydroxy-tert. octyl phenyl octa decyl alcohol purified by distillation in vacuo.

Example 5

One mol of oleyl alcohol is mixed with 2 mols of concentrated sulfuric acid and to this mixture one mol of guaiacol is added while stirred vigorously. The mixture is then allowed to stand for a week at room temperature. The reaction mixture is then washed with water. If the free guaiacol substituted stearyl alcohol is to be obtained the condensation product is saponified and the resulting product of hydrolysis is purified by distillation under diminished pressure.

Example 6

One mol of oleyl alcohol is mixed with 2 mols of concentrated sulfuric acid and to this mixture a solution of one mol of resorcinol in glacial acetic acid is added while being stirred vigorously. The resulting mixture is finally heated to about 50° C. for 2 hours after which time the reaction mass is poured into water to remove unreacted water soluble reactants.

Example 7

To a mixture consisting of one mol of oleyl alcohol and 2 mols of concentrated sulfuric acid, p-chloro phenol is added. After washings with water and subsequent hydrolysis of the sulfuric acid ester formed the saponified product is distilled under diminished pressure. The product boiling between 255–270° C. at 15 mm. proved to be the hydroxy-p-chloro-phenyl octadecyl alcohol.

Example 8

To a mixture consisting of one mol oleyl alcohol, one mol of alpha naphthol and enough acetic acid to give a homogeneous mixture at 50° C. 1.5 mols of concentrated sulfuric acid were added under constant stirring. The reaction mixture was kept at 60–70° C. for a few hours and was then washed with water to remove any water soluble products. The condensation product may be hydrolyzed first and then further purified by distillation in vaccuo.

The above are only examples of the various procedures which may be used in accordance with the present invention, and they are not to be considered as limiting my invention but only as illustrating it. My invention is, therefore, to be broadly construed and to be limited only as set forth in the claims appended hereto.

This application is a continuation in part of my co-pending application Serial 688,982 filed Sept. 11, 1933.

In a similar manner, the analogous condensation products of oleyl alcohol with o-cresol, o-salicylic acid, octyl phenol-, thymol, hydroquinone, catechol, pyrocatechol, beta naphthol and the other phenols mentioned herein can be obtained. It is understood that various minor changes may be made in the mode of conducting this condensation or the rearrangement without departing from the scope of the invention. Thus higher or lower temperatures can be used and the use of a solvent or acetic acid can be dispensed with.

What I claim is:

1. A method of producing condensation products which comprises reacting an alkenol with an aryl hydroxy compound having a free reactive nuclear position in the presence of a katenoid condensing agent having an acid reaction.

2. A method of producing condensation products which comprises reacting an alkenol with an aryl hydroxy compound having a free reactive nuclear position in the presence of a sulfuric acid condensing agent.

3. A method of producing condensation products which comprises reacting an alkenol with an aryl hydroxy compound having a free reactive nuclear position in the presence of a sulfuric acid condensing agent and hydrolyzing the product.

4. A method of producing condensation products which comprises reacting an alkenol with an aryl hydroxy compound having a free reactive nuclear position in the presence of a katenoid condensing agent having an acid reaction at a temperature below about 100° C.

5. A method of producing condensation products which comprises reacting an alkenol with an aryl hydroxy compound having a free reactive nuclear position in the presence of a sulfuric acid condensing agent at a temperature below about 100° C.

6. A method of producing condensation products which comprises reacting oleyl alcohol with a phenol having a free reactive nuclear position in the presence of a katenoid condensing agent having an acid reaction.

7. A method of producing condensation products which comprises reacting oleyl alcohol with a phenol having a free reactive nuclear position in the presence of a katenoid condensing agent having an acid reaction at a temperature below about 100° C.

8. Hydroxy-aryl stearyl alcohols.
9. Hydroxy phenyl-stearyl alcohols.
10. Hydroxy-naphthyl stearyl alcohols.

JOSEPH B. NIEDERL.